United States Patent
Courchaine et al.

(10) Patent No.: US 10,761,285 B2
(45) Date of Patent: Sep. 1, 2020

(54) CABLE MOUNTING CLAMPS

(71) Applicant: AFL Telecommunications LLC, Duncan, SC (US)

(72) Inventors: Wilfred J. Courchaine, Moore, SC (US); Shirley Ball, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/862,225

(22) Filed: Jan. 4, 2018

(65) Prior Publication Data

US 2019/0204522 A1    Jul. 4, 2019

(51) Int. Cl.
*G02B 6/44* (2006.01)
*H02G 3/34* (2006.01)
*H02G 3/32* (2006.01)
*H02G 15/18* (2006.01)

(52) U.S. Cl.
CPC ......... *G02B 6/4471* (2013.01); *G02B 6/4446* (2013.01); *G02B 6/4452* (2013.01); *H02G 3/32* (2013.01); *H02G 3/34* (2013.01); *G02B 6/4477* (2013.01); *H02G 15/1806* (2013.01)

(58) Field of Classification Search
USPC .... 248/73, 74.1, 74.2, 230.6, 230.7, 231.71, 248/231.81, 316.7, 316.1; 174/68.1, 174/72 A, 70 R
See application file for complete search history.

(56) References Cited

U.S. PATENT DOCUMENTS

| | | | | |
|---|---|---|---|---|
| 3,128,073 A | * | 4/1964 | Berlyn | ...................... F16L 3/16 248/55 |
| 4,750,841 A | * | 6/1988 | Hicks | .................. B29C 48/2665 366/79 |
| 5,388,321 A | * | 2/1995 | Farrell | ..................... F16L 33/02 285/23 |
| 6,209,827 B1 | | 4/2001 | Kawai | |
| 6,717,055 B2 | * | 4/2004 | Kato | ................... B60R 16/0215 173/136 |

(Continued)

FOREIGN PATENT DOCUMENTS

EP      2738046 A1    6/2014
WO   WO2010/024842 A1   3/2010

OTHER PUBLICATIONS

AFL Telecommunications LLC; International Patent Application No. PCT/US2018/066426; International Search Report; dated Feb. 21, 2019; (2 pages).

*Primary Examiner* — Alfred J Wujciak
(74) *Attorney, Agent, or Firm* — Dority & Manning, P.A

(57) ABSTRACT

A cable assembly includes a cable and a cable mounting clamp. The cable mounting clamp includes a base removably connectable to a surface. The base may include a tab removably insertable into an aperture defined in the surface and a lock releasably connectable to the surface. The base further includes an outer body which defines an inner channel and a support ramp disposed within the inner channel, the inner channel extending along a longitudinal axis. The cable mounting clamp further includes a cap connectable to the base to further define the inner channel therebetween. The cable mounting clamp further includes a roller tube disposed within the inner channel and rotatably mounted on the support ramp, the roller tube rotatable about the longitudinal axis.

20 Claims, 9 Drawing Sheets

(56) References Cited

U.S. PATENT DOCUMENTS

| | | |
|---|---|---|
| 7,090,407 B2 | 8/2006 | Melton et al. |
| 7,645,938 B2 * | 1/2010 | Kogure ............... B60R 16/0215 |
| | | 174/68.1 |
| 9,535,230 B2 | 1/2017 | Newbury et al. |
| 10,008,843 B2 * | 6/2018 | Yamamoto .......... B60R 16/0215 |
| 2010/0215330 A1 | 8/2010 | Sokolowski et al. |
| 2017/0191589 A1 * | 7/2017 | Floyd ..................... F16L 23/06 |

* cited by examiner

CABLE MOUNTING CLAMPS

FIELD

The present disclosure relates generally to cable mounting clamps, such as for mounting cables to enclosure.

BACKGROUND

Secure mounting of cables during installation thereof is a necessity in a variety of environments. One such environment is in fiber optics, and in particular in the fiber optic inside office environment. In such environment, fiber optic distribution enclosures are utilized to manage optical fiber distribution. An enclosure typically accommodates one or more fiber trays, each of which includes one or more cassettes. Within a cassette, an incoming optical fiber may be spliced, split, etc., and outgoing optical fibers may be connected to the cassette and incoming optical fibers to provide fiber optic connections within the inside office environment. The incoming cables which include incoming optical fibers must be secured to the enclosures to facilitate secure, reliable connections.

Current techniques for mounting cables require the use of tie-wraps, hook-and-loop fasteners, hose clamps, bracket clamps, etc. In many cases, the mounting performance using such apparatus is less than desirable, and/or the ability to remove and reattach such apparatus to relocate or adjust the associated cable is limited. Additionally, while some "quick-release" type solutions are available, these solutions require an additional mounting plate to be secured within the enclosure. Further, presently known mounting solutions do not relieve torsional or bending stresses in the associated cables.

Accordingly, improved cable mounting clamps are desired. For example, cable mounting clamps which are easily and efficiently removable and reattachable in associated environments, such as to associated enclosures, would be advantageous. Additionally or alternatively, cable mounting clamps which include features for relieving torsional or bending stresses in associated cables would be advantageous.

BRIEF DESCRIPTION

Aspects and advantages of the invention will be set forth in part in the following description, or may be obvious from the description, or may be learned through practice of the invention.

In accordance with one embodiment, a cable mounting clamp is provided. The cable mounting clamp may be provided for mounting a cable to a surface. The cable mounting clamp includes a base removably connectable to the surface. The base may include a tab removably insertable into an aperture defined in the surface and a lock releasably connectable to the surface. The base further includes an outer body which defines an inner channel and a support ramp disposed within the inner channel, the inner channel extending along a longitudinal axis. The cable mounting clamp further includes a cap connectable to the base to further define the inner channel therebetween. The cable mounting clamp further includes a roller tube disposed within the inner channel and rotatably mounted on the support ramp, the roller tube rotatable about the longitudinal axis.

In accordance with one embodiment, a cable assembly is provided. The cable assembly may be mountable to a surface. The cable assembly includes a cable and a cable mounting clamp. The cable mounting clamp includes a base removably connectable to the surface. The base may include a tab removably insertable into an aperture defined in the surface and a lock releasably connectable to the surface. The base further includes an outer body which defines an inner channel and a support ramp disposed within the inner channel, the inner channel extending along a longitudinal axis. The cable mounting clamp further includes a cap connectable to the base to further define the inner channel therebetween. The cable mounting clamp further includes a roller tube disposed within the inner channel and rotatably mounted on the support ramp, the roller tube rotatable about the longitudinal axis. The cable is inserted through the roller tube and extends through the inner channel, such that the cable is rotatable with the roller tube about the longitudinal axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
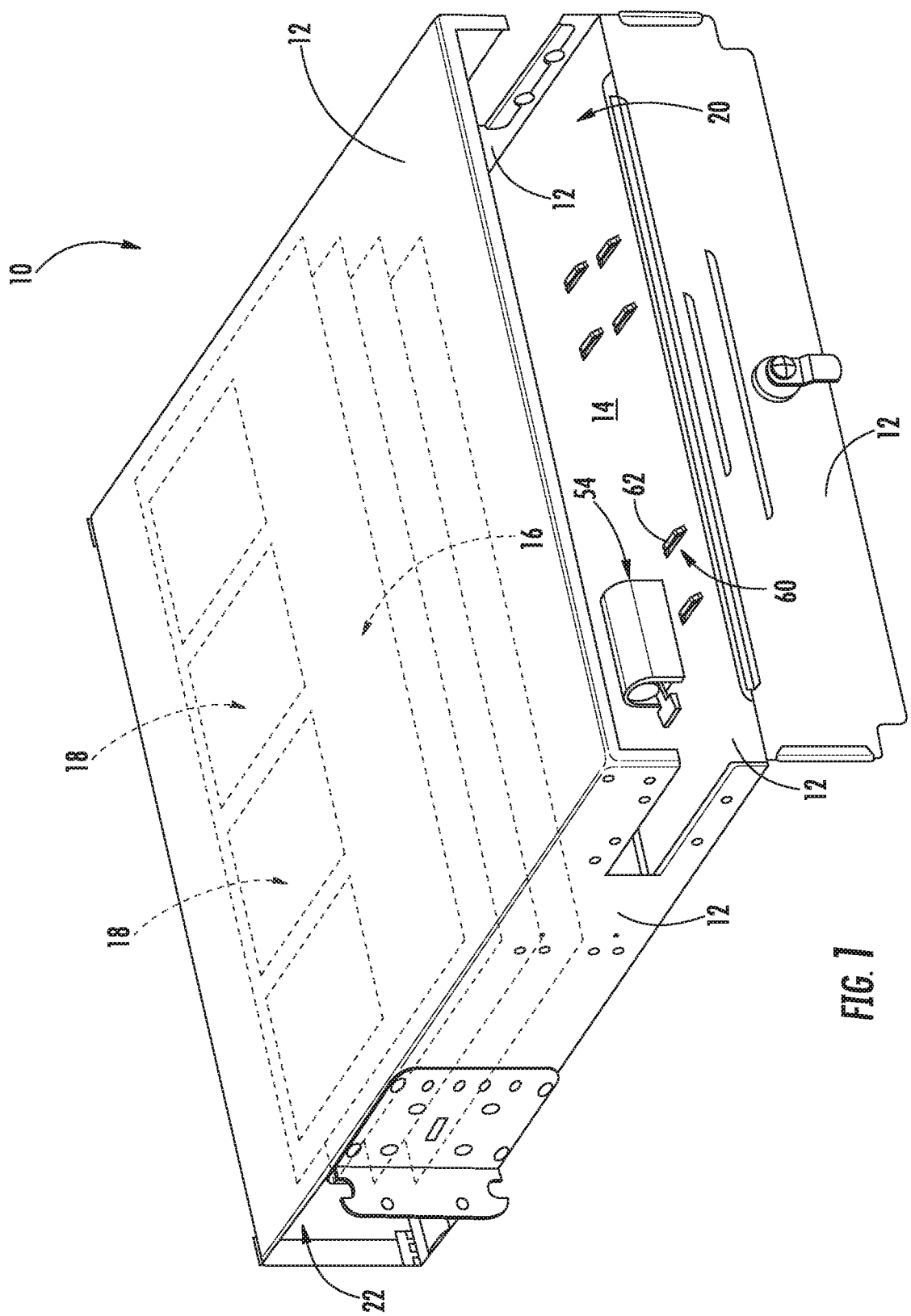
FIG. 1 is a rear perspective view of a fiber optic distribution enclosure in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, one embodiment of a fiber optic distribution enclosure 10 is provided. Fiber optic distribution enclosures 10 are generally utilized to manage optical fiber distribution, typically in inside office environments. Enclosure 10 includes one or more walls 12, as shown, which define an interior 14 of the enclosure. Within the enclosure, one or more trays 16 may be housed. Each tray 16 may include one or more cassettes 18.

In general, an incoming fiber optic cable which includes a plurality of optical fibers may enter the interior 14 of the enclosure 10 via a rear opening 20 defined by the walls 12. Optical fibers of the incoming fiber optic cable may extend from the cable within the interior 14. These optical fibers may be routed into one or more of the cassettes 18, and spliced, split, etc. within the cassettes 18. Outgoing optical fibers may also be routed to the cassettes 18, and connected to the incoming optical fibers via splicing, splitting, etc. These outgoing optical fibers may be routed from the cassettes 18, and may exit the interior 14 of the enclosure 10 via a front opening 22 of the enclosure 10.

The incoming fiber optic cable must be secured to the enclosure 10 to facilitate secure, reliable connections of the incoming optical fibers, and to prevent risk of breaking or damaging such incoming optical fibers. Accordingly, the present disclosure is directed to cable assemblies 50 which are mountable to surfaces, such to the walls 12 of enclosures 10 as discussed herein.

More specifically, a cable assembly 50 in accordance with the present disclosure includes a cable 52 and one or more cable mounting clamps 54. The cable mounting clamp(s) 54 securely and removably mount the cable 52 to an associated surface, such as in exemplary embodiments a wall 12 of an enclosure 10. Such secure, removable mounting is a direct mounting, with direct contact between the clamp 54 and surface (such as the wall 12), thus eliminating the need for additional mounting plates, etc. to be installed (such as in the enclosure 10). Cable mounting clamps 54 in accordance with the present disclosure advantageously facilitate efficient mounting and removal of cables 52, and further advantageously facilitate relief of torsional or bending stresses in the cables 52.

Referring now to FIGS. 2 through 18, various embodiments of cable assemblies 50 and cable mounting clamps 54 in accordance with the present disclosure are provided. In general, a cable mounting clamp 54 in accordance with the present disclosure may include a base 100, a cap 102, and a roller tube 104. Base 100 may generally be removably connectable to a surface (such as a wall 12) to securely and removable mount the clamp 54 to the surface. Roller tube 104 may be positioned between the base 100 and cap 102, and may be rotatable about an axis of the clamp 54 to facilitate rotation of a cable 52 disposed therein. Cable 52 may extend through the roller tube 104 and between the base 100 and cap 102, and be rotatable relative to the base 100 and cap 102 with the roller tube 104.

Base 100 generally includes an outer body 110 which defines an inner channel 112. The inner channel 112 extends along an axis 56 of the clamp 54. In exemplary embodiments, the axis 56 is a longitudinal axis 56 of the clamp 54. A support ramp 114, which may be an inner surface of the base 110, may be disposed within and may partially define the inner channel 112. Support ramp 114 may have an arcuate shape about the axis 56, and thus for example be an arcuate surface as shown.

Further, in exemplary embodiments, support ramp 114 may include first and second rails 116, 118, respectively. The rails 116, 118 may extend from the ramp 114 into the inner channel 112 and be spaced apart from each other along the axis 56 act as borders of the support ramp 114.

Base 100 may further include one or more tabs 120 and one or more locks 122. The tabs 120 generally locate the base 100 in position on a surface (such as a wall 12) for secure connection thereto, and the locks 122 releasably connect the base 100 (and thus the clamp 54) to the surface (such as the wall 12). For example, each tab 120 may be removable insertable into an aperture 60, which may for example be defined in a lance or a catch, as discussed herein, of the surface. Each lock 122 may be releasably connectable to the surface (such as the wall 12).

Referring for example to FIGS. 2 through 5 and 8, in some embodiments the base 100 includes a plurality (such as two as shown) of tabs 120 and a lock 122 that is separate from the tabs 120. In these embodiments, tabs 120 are positioned within an interior of the base 100, and are aligned along the axis 56. Lock 122 is a lever which includes a handle 130, a pivot point 132, and a contact face 134. Pivot point 132 is disposed between the handle 130 and the contact face 134, such that the contact face 134 is opposite the handle 130 relative to the pivot point 132.

Figure 2:
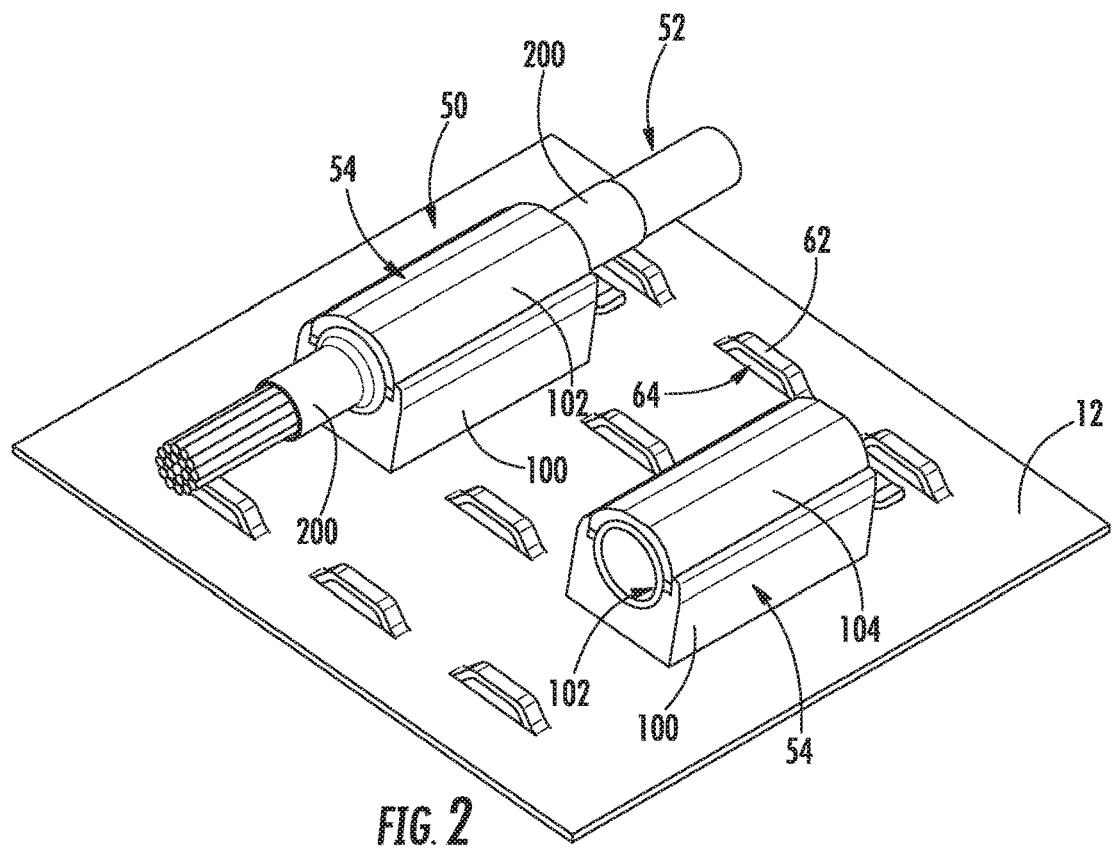
FIG. 2 is a top perspective view of a cable assembly and cable mounting clamp mounted to a wall of a fiber optic distribution enclosure in accordance with embodiments of the present disclosure.
Figure 3:
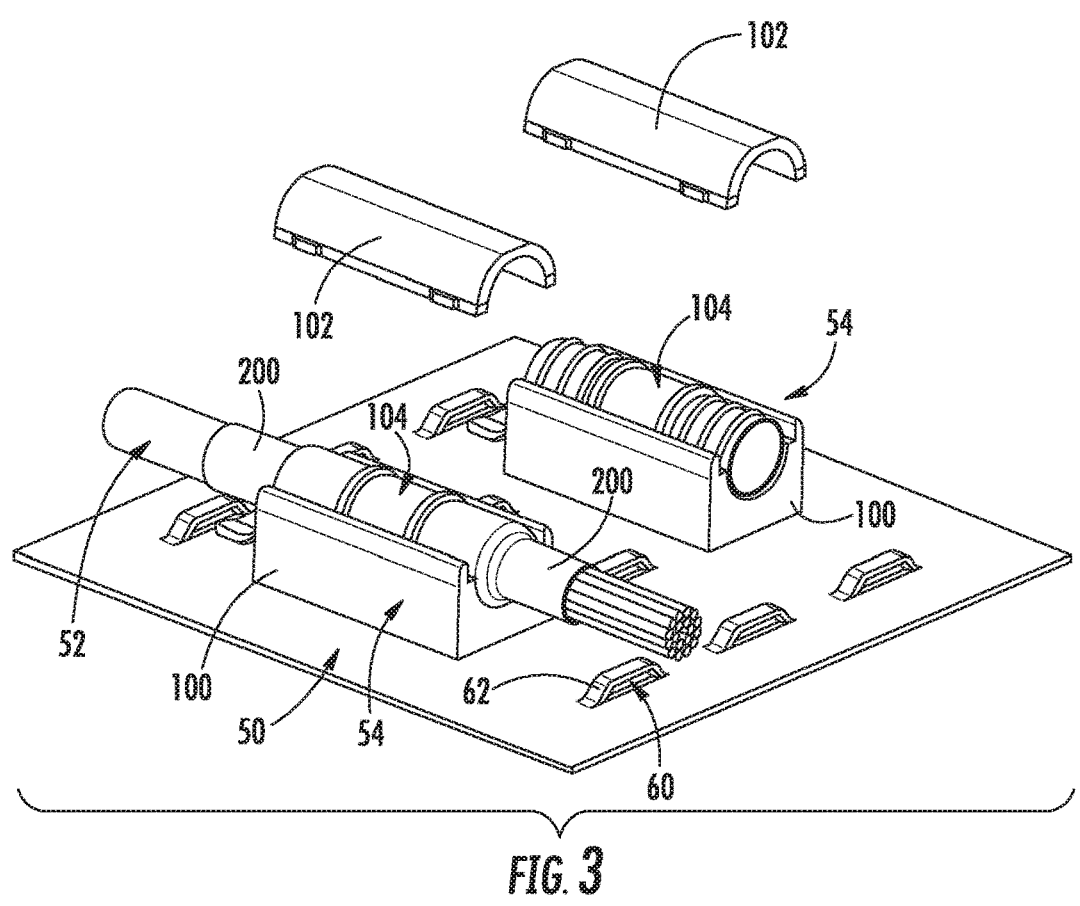
FIG. 3 is a top perspective view of a cable assembly and cable mounting clamp mounted to a wall of a fiber optic distribution enclosure, with caps exploded therefrom, in accordance with embodiments of the present disclosure.
Figure 4:
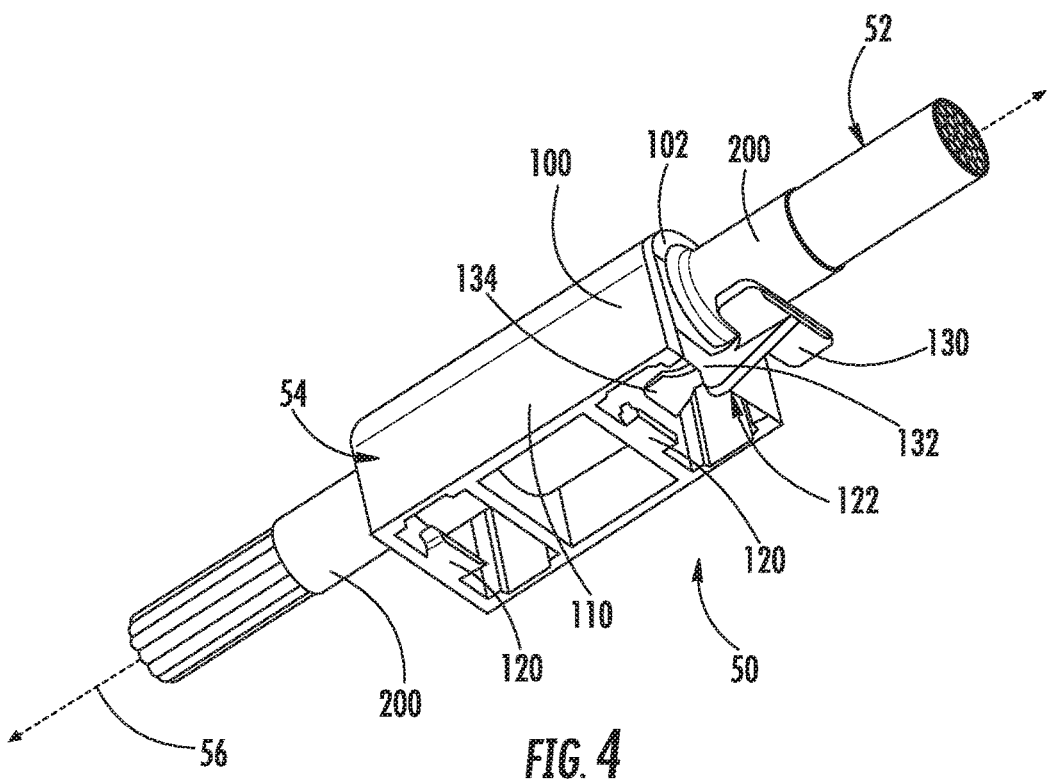
FIG. 4 is a bottom perspective view of a cable assembly in accordance with embodiments of the present disclosure.
Figure 5:
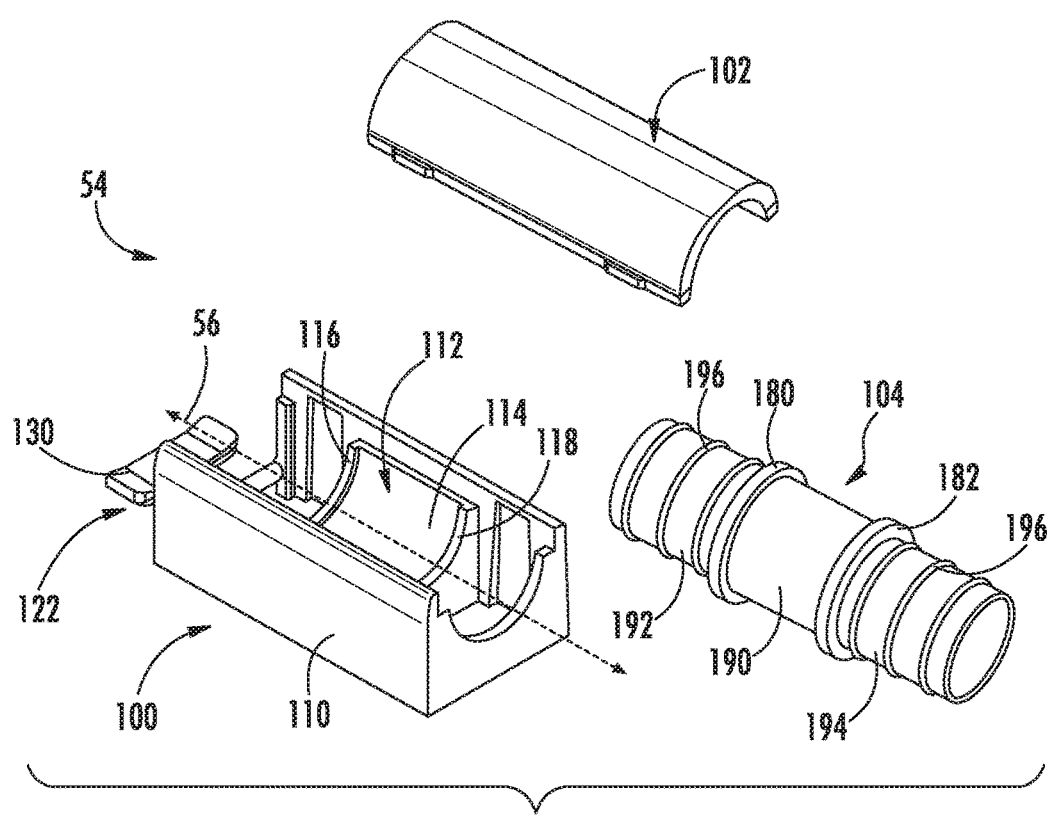
FIG. 5 is an exploded perspective view of components of a cable mounting clamp in accordance with embodiments of the present disclosure.
Figure 6:
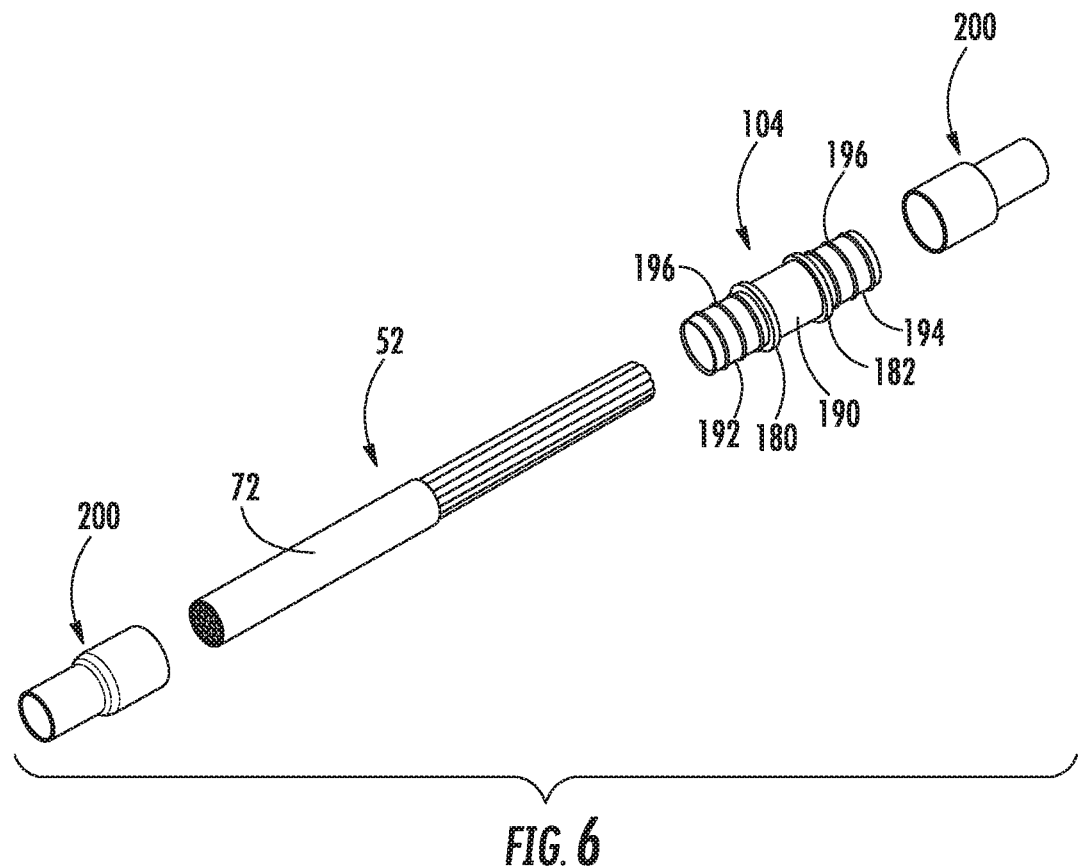
FIG. 6 is an exploded perspective view of components of a cable assembly in accordance with embodiments of the present disclosure.
Figure 7:
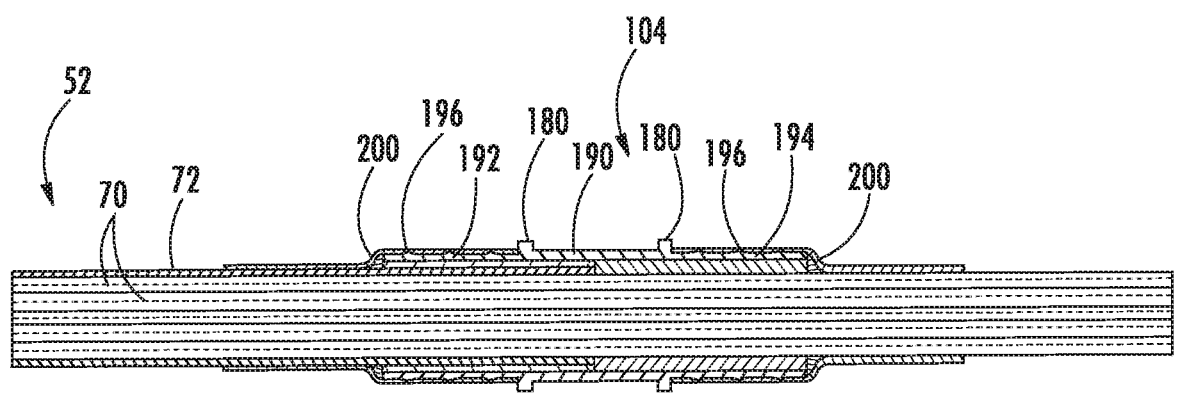
FIG. 7 is an assembled cross-sectional view of the components of FIG. 6.
Figure 8:
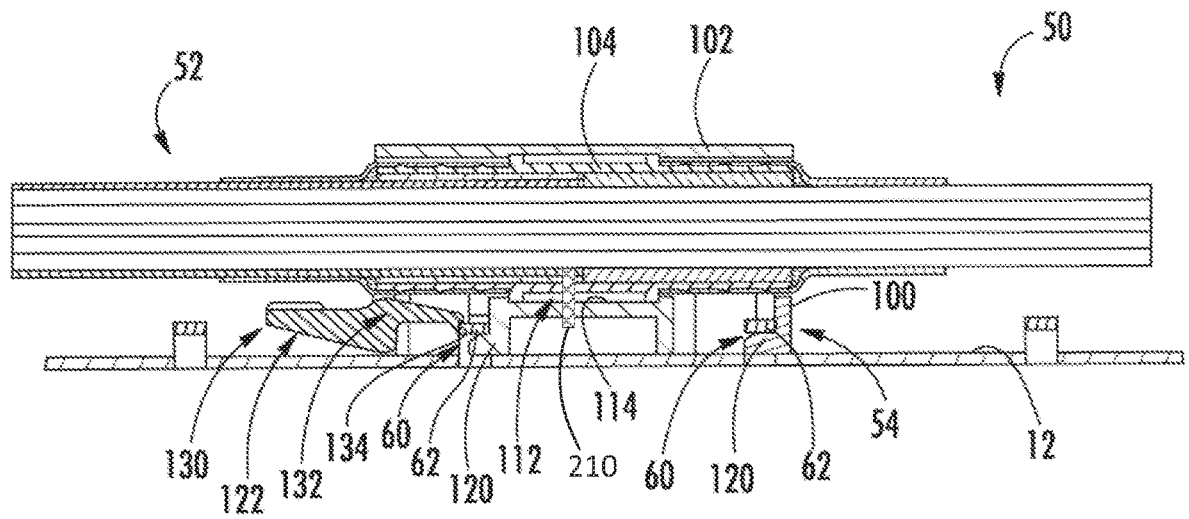
FIG. 8 is a cross-sectional view of a cable assembly, with a cable mounting clamp thereof in a locked position, in accordance with embodiments of the present disclosure.
Figure 9:
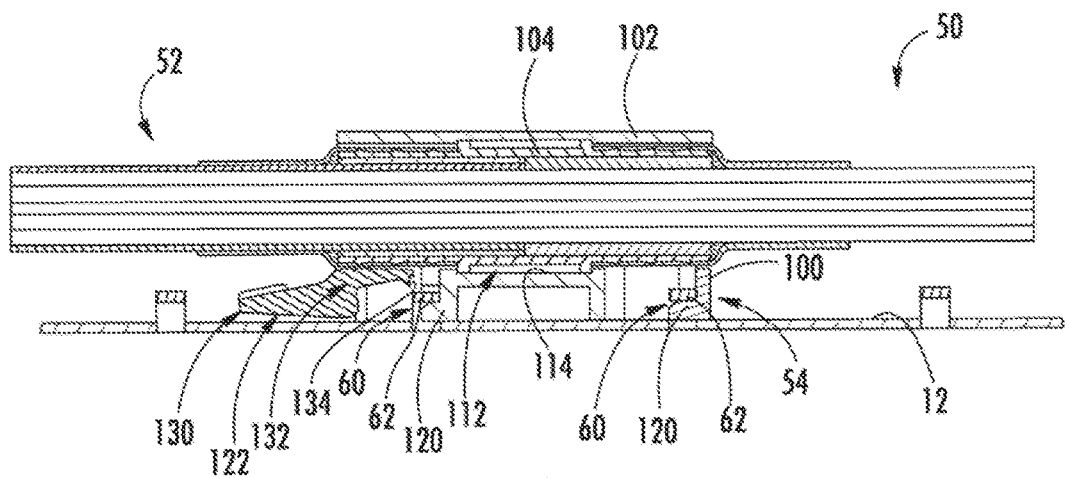
FIG. 9 is a cross-sectional view of a cable assembly, with a cable mounting clamp thereof in an unlocked position, in accordance with embodiments of the present disclosure.

To mount the base 100 (and thus the clamp 54) to a surface (such as a wall 12), the tabs 120 may be inserted through apertures 60, which as illustrated in FIGS. 2, 3, and 8 may be defined in lances 62 which are formed from the surface. The contact face 134 may contact one of the lances 62, thus removably locking the base 100 (and thus the clamp 54) in place, mounted to the surface. To remove the base 100, the handle 130 may be pressed on by a user, and this force may cause rotation of the contact face 134 about the pivot point 132 such that the contact face 134 no longer contacts the lance 62. This lack of contact then allows the user to slide the tabs 120 from within the apertures 60, thus removing the base 100 from being mounted to the surface.

Figure 10:
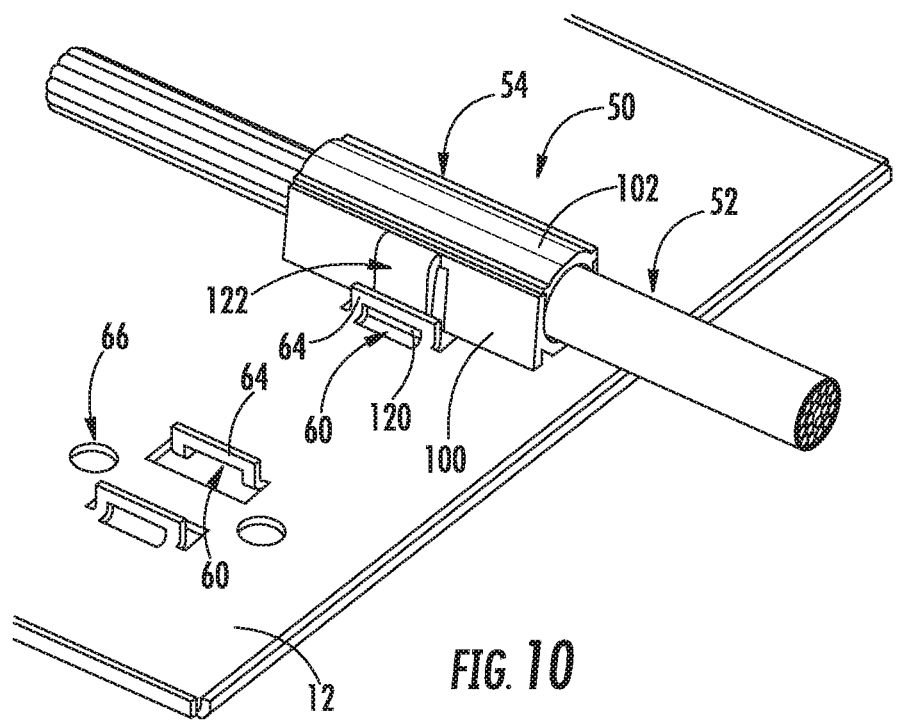
FIG. 10 is a top perspective view of a cable assembly mounted to a wall of a fiber optic distribution enclosure in accordance with embodiments of the present disclosure.
Figure 11:
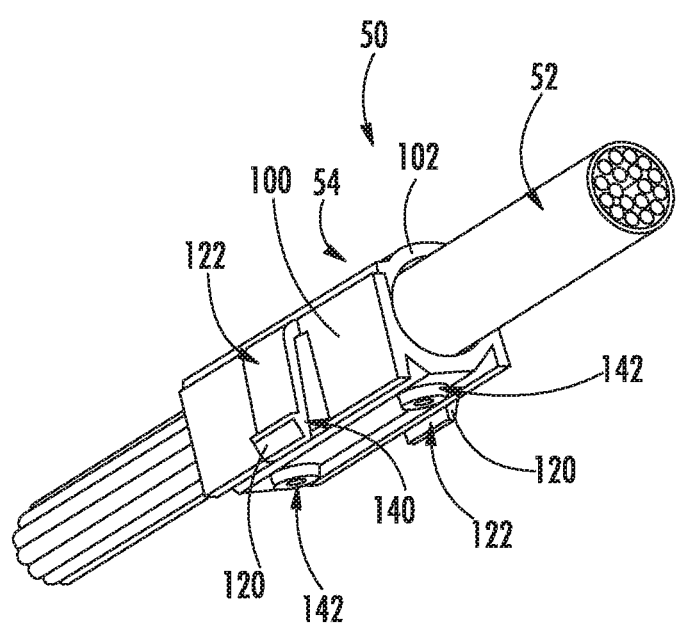
FIG. 11 is a bottom perspective view of a cable assembly in accordance with embodiments of the present disclosure.

In other embodiments, as illustrated for example in FIGS. 10 and 11, the base 100 includes a plurality (such as two as shown) of tabs 120 and a plurality (such as two as shown) of locks 122. In these embodiments, the tabs 120 are components of the locks 122. The locks 122 are arms which are cantilevered from and exterior to the base 100. The locks 122 may further be spaced from each other about the axis 56. Tabs 120 may extend from distal ends 140 of the arms.

To mount the base 100 (and thus the clamp 54) to a surface (such as a wall 12), the tabs 120 may be inserted though apertures 60, which as illustrated in FIG. 10 may be defined in catches 64 which are formed from the surface. The spring force of the cantilevered arms may cause the arms to bias outwards away from the base 100, such that the tabs 120 are maintained in the apertures 60, thus removably locking the base 100 (and thus the clamp 54) in place, mounted to the surface. To remove the base 100, the arms may be pressed on by a user, and this inward force may counteract the biasing force, cause movement of the arms such that the tabs 120 are removed from the apertures 60. In this manner, the base 100 can be removed from being mounted to the surface.

Additionally, in some embodiments as illustrated in FIG. 11, one or more locating protrusions 142 may extend from the base 100. The locating protrusions 142 may act to orient and locate the base 100 (and thus the clamp 54) on a surface (such as a wall 12) for mounting thereon as discussed herein. For example, the locating protrusions 142 may be seatable in holes 66 defined in the surface to orient and locate the base 100. Additionally, the seated protrusions 142 may provide additional strength to the base 100, in particular along the axial direction.

Figure 12:
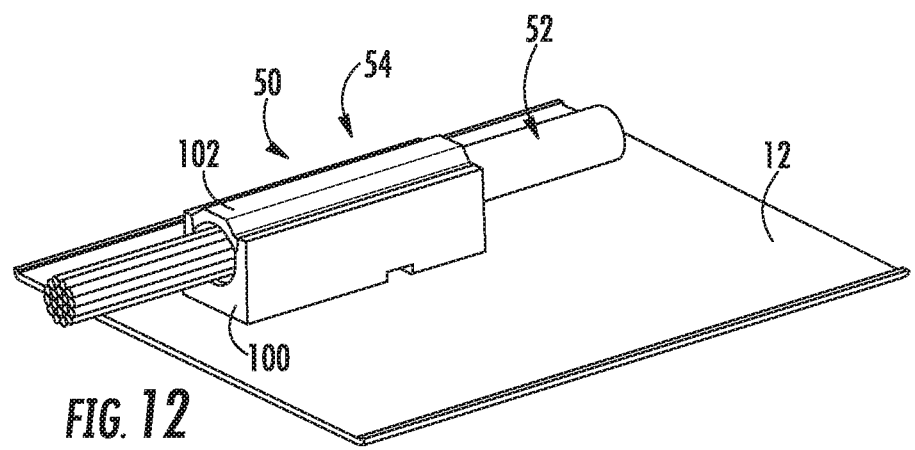
FIG. 12 is a top perspective view of a cable assembly mounted to a wall of a fiber optic distribution enclosure in accordance with embodiments of the present disclosure.
Figure 13:
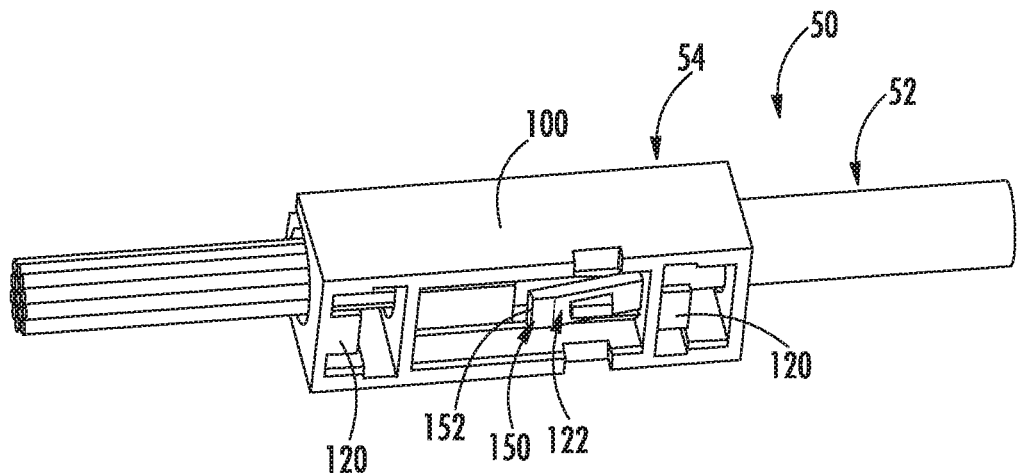
FIG. 13 is a bottom perspective view of a cable assembly in accordance with embodiments of the present disclosure.
Figure 14:
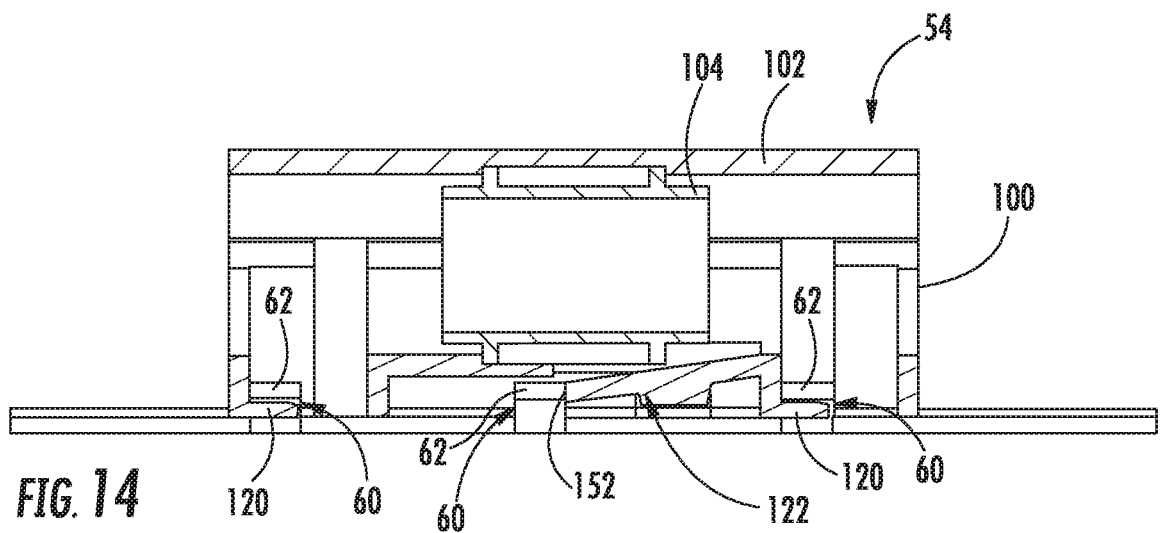
FIG. 14 is a cross-sectional view of a cable assembly, with a cable mounting clamp thereof in a locked position, in accordance with embodiments of the present disclosure.

In other embodiments, as illustrated for example in FIGS. 12 through 14, the base 100 includes a plurality (such as two as shown) of tabs 120 and a lock 122 that is separate from the tabs 120. In these embodiments, tabs 120 are positioned within an interior of the base 100, and are aligned along the axis 56. Lock 122 is also positioned within an interior of the base 100, and is an arm which is cantilevered from the base 100. The arm may include a contact face 152 at a distal end 150 of the arm.

To mount the base 100 (and thus the clamp 54) to a surface (such as a wall 12), the tabs 120 may be inserted through apertures 60, which as illustrated in FIG. 14 may be defined in lances 62 which are formed from the surface. The contact face 152 may contact one of the lances 62, thus removably locking the base 100 (and thus the clamp 54) in place, mounted to the surface. To remove the base 100, the arm may be pressed on, and this force may cause movement of the arm such that the contact face 152 no longer contacts the lance 62. This lack of contact then allows the user to slide the tabs 120 from within the apertures 60, thus removing the base 100 from being mounted to the surface.

Figure 15:
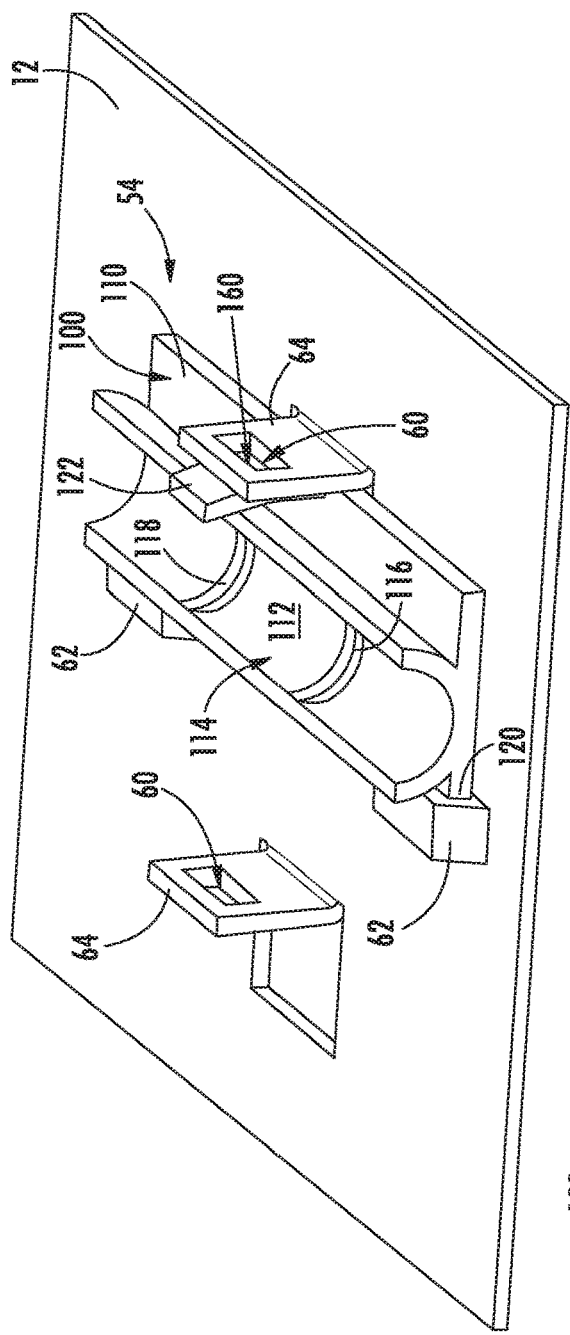
FIG. 15 is a top perspective view of components of a cable mounting clamp mounted to a wall of a fiber optic distribution enclosure in accordance with embodiments of the present disclosure.
Figure 16:
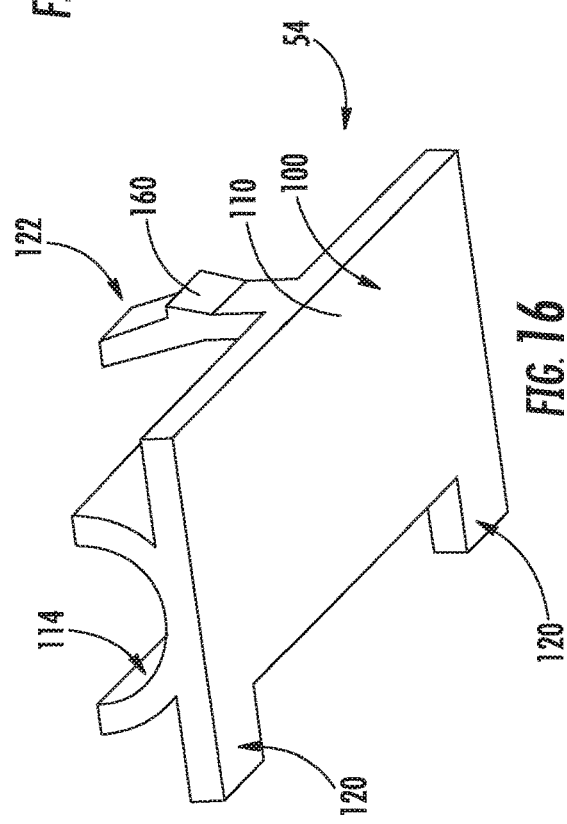
FIG. 16 is a bottom perspective view of components of a cable mounting clamp in accordance with embodiments of the present disclosure.

In other embodiments, as illustrated for example in FIGS. 15 and 16, the base 100 includes a plurality (such as two as shown) of tabs 120 and a lock 122 separate from the tabs 120. In these embodiments, the tabs 120 extend from and exterior to the body 100. The lock 122 is an arm which is cantilevered from and exterior to the base 100. The arm further includes a stop 160 extending therefrom. The lock 122 is spaced from the tabs 120 about the axis 56.

To mount the base 100 (and thus the clamp 54) to a surface (such as a wall 12), the tabs 120 may be inserted though apertures 60, which as illustrated in FIG. 16 may be defined in lances 62 which are formed from the surface. The stop 160 may additionally be inserted into an aperture 60, which as illustrated in FIG. 16 may be defined in a catch 64 which is formed from the surface. Insertion of the stop 160 in the associated aperture 60 removably locks the base 100 (and thus the clamp 54) in place, mounted to the surface. To remove the base 100, the arm may be pressed on by a user, and this inward force may cause movement of the arm such that the stop 160 is removed from the associated aperture 60. In this manner, the base 100 can be removed from being mounted to the surface.

Figure 17:
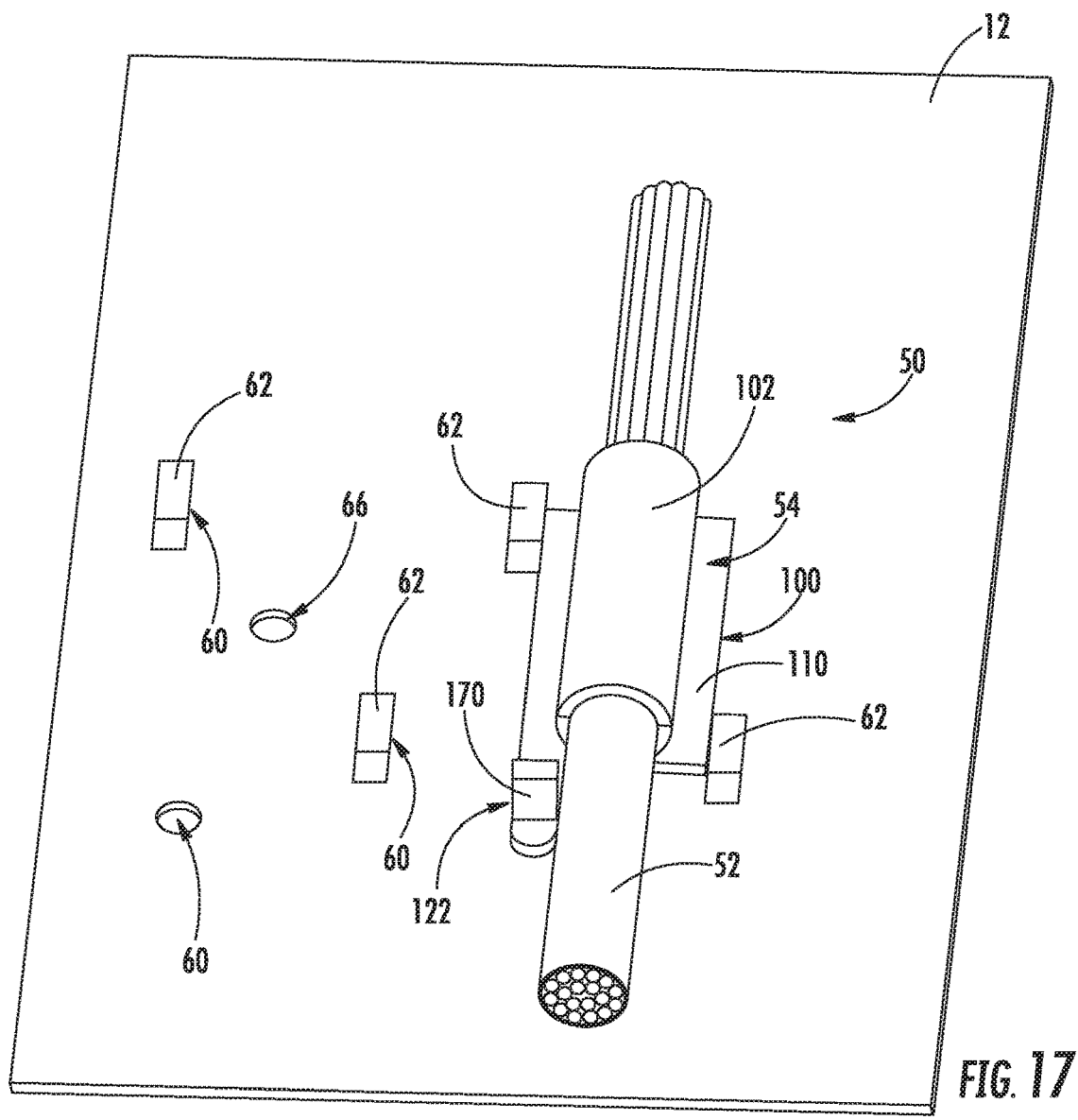
FIG. 17 is a top perspective view of a cable assembly mounted to a wall of a fiber optic distribution enclosure in accordance with embodiments of the present disclosure.
Figure 18:
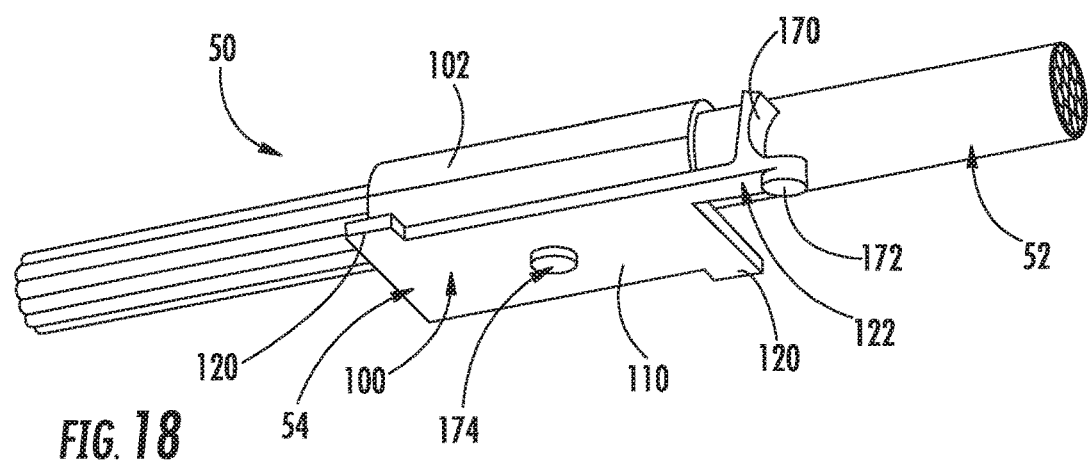
FIG. 18 is a bottom perspective view of a cable assembly in accordance with embodiments of the present disclosure.

In other embodiments, as illustrated for example in FIGS. 17 and 18, the base 100 includes a plurality (such as two as shown) of tabs 120 and a lock 122 separate from the tabs 120. In these embodiments, the tabs 120 extend from and exterior to the body 100, and are spaced from each other both about and along the axis 56. The lock 122 is arm which is cantilevered from and exterior to the base 100. The arm further includes a handle 170 extending from the arm in a first direction and a detent 172 extending from the arm in a second direction opposite the first direction.

To mount the base 100 (and thus the clamp 54) to a surface (such as a wall 12), the tabs 120 may be inserted though apertures 60, which as illustrated in FIG. 16 may be defined in lances 62 which are formed from the surface. The detent 172 may additionally be inserted into an aperture 60, which as illustrated in FIG. 17 may be a hole defined in the surface. Insertion of the detent 172 in the associated aperture 60 removably locks the base 100 (and thus the clamp 54) in place, mounted to the surface. To remove the base 100, the handle may be pressed on by a user, and this force may cause movement of the arm such that the detent 172 is removed from the associated aperture 60. In this manner, the base 100 can be removed from being mounted to the surface.

Additionally, in some embodiments as illustrated in FIG. 18, one or more locating protrusions 174 may extend from the base 100. The locating protrusions 174 may act to orient and locate the base 100 (and thus the clamp 54) on a surface (such as a wall 12) for mounting thereon as discussed herein. For example, the locating protrusions 174 may be seatable in holes 66 defined in the surface to orient and locate the base 100. Additionally, the seated protrusions 174 may provide additional strength to the base 100, in particular along the axial direction.

Referring again now to FIGS. 2 through 18, and as discussed above, a clamp 54 further includes a cap 102 and a roller tube 104. The cap 102 is generally connectable to (and, when assembled, connected to) the base 100 to further define the inner channel 112 therebetween. In exemplary embodiments, cap 102 may have an inner surface which has an arcuate shape about the axis 56, and thus may for example be an arcuately shaped cap 102 as shown.

Roller tube 104 may be positionable within (and, when assembled, disposed within) the inner channel 112. Further, the roller tube 104 may be rotatably mounted on the support ramp 114, and rotatable about the axis 56. For example, roller tube 104 may be positioned in the inner channel 112 such that the roller tube 104 extends along the axis 56. Further, the roller tube 104 may be in contact with the support ramp 114. Rotation about the axis 56 may be relative to both the base 100 and the cap 102.

It should be noted that roller tube 104 (along with cap 102) may be utilized with any one or more of the various base 100 embodiments disclosed in FIGS. 2 through 18.

In some embodiments, roller tube 104 includes a first outer flange 180 and a second outer flange 182, which may be annular flanges as shown. The first and second outer flanges 180, 182 may be spaced apart along the axis 56. In exemplary embodiments, when the roller tube 104 is seated in the inner channel 112, the first and second outer flanges 180, 182 may contact the support ramp 114. Further, contact between the first outer flange 180 and first rail 116, and contact between the second outer flange 182 and second rail 118, may limit axial movement of the roller tube 104.

In some embodiments, roller tube 104 includes a central portion 190, a first end portion 192, and a second end portion 194. The first and second end portions 192, 194 extend in opposite directions from the central portion 190, such as in opposite directions along the axis 56. In some embodiments, the first outer flange 180 may be disposed between and define the first end portion 192 and central portion 190, and the second outer flange 182 may be disposed between and define the second end portion 194 and central portion 190. In some embodiments, the first and second end portions 192, 194 may each include one or more ribs 196, which may be annular ribs as shown.

Further, in some embodiments, clamp 54 may include one or more heat shrink tubes 200. Each heat shrink tube 200 may be connected to the roller tube 104. For example, in some embodiments as shown, a heat shrink tube 200 may be connected to and extend from the first end portion 192, and a heat shrink tube 200 may be connected to and extend from the second end portion 194. In some embodiments, ribs 196 may contact the heat shrink tube(s) 200 and assist in maintaining the location of the heat shrink tube(s) 200 by preventing the heat shrink tube(s) 200 from slipping from the roller tube 104 (such as the end portions 192, 194 thereof).

In some embodiments, as illustrated in FIG. 8, a clamp 54 may further include a second lock 210. In these embodiments, the lock(s) 122 may be referred to as first lock(s) 122. The second lock 210 may be selectively engageable with the roller tube 104 to selectively prevent rotation of the roller tube 104. For example, initial rotation of the roller tube 104 may be desired, such as immediately after the clamp 54 and cable assembly 50 generally are mounted to a surface (such as a wall 12). Such rotation may facilitate ease of positioning an associated cable 52, with reduced concerns for torsional or bending stresses in the cable 52. Once positioned, however, it may be desirable to prevent further rotation of the roller tube 104 in order to maintain the position of the cable 52. Accordingly, the second lock 210 may be engaged, such as in contact with the roller tube 104, to prevent rotation of the roller tube 104 until the second lock 210 is disengaged.

In exemplary embodiments as shown, the second lock 210 is a set screw. In these embodiments, the set screw may be engageable through the support ramp 114 in contact with an outer surface of the roller tube 104, and such engagement may limit or prevent rotation of the roller tube 104. The set screw may further be disengageable out of contact with the roller tube 104 to again allow unimpeded rotation thereof.

As discussed, cable assemblies 50 in accordance with the present disclosure include a cable 52 and one or more cable mounting clamps 54. The clamps 54 may be installable onto a cable 52 by a user, or may be factory pre-installed on the cable 52. In exemplary embodiments as shown, cable 52 is a fiber optic cable 52 which includes a plurality of optical fibers 70 disposed within an outermost exterior jacket 72. Mounting of a clamp 54 on a surface may, in exemplary embodiments, further mount the associated cable assembly 50 and cable 52 thereof, thus efficiently, securely and removably positioning the cable 52 on the surface.

When installed, a cable 52 may be inserted through a roller tube 104. Additionally, in some embodiments as shown, cable 52 may be inserted through the heat shrink tube(s) 200 that are connected to the roller tube 104, such that the heat shrink tube(s) 200 are also connected to the cable 52. In these embodiments, the heat shrink tube(s) 200 may be shrunk onto the cable 52 and roller tube 104. Because the roller tube 104 is disposed in the inner channel 112, the cable 52 may further extend through the inner channel 112, such as along the axis 56. Cable 52 may be generally fixed relative to the roller tube 104, such as in some embodiments due to contact by the heat shrink tube(s) 200, and thus may be generally not movable relative to the roller tube 104. However, advantageously, the cable 52 may be rotatable with the roller tube 104 about the longitudinal axis 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable mounting clamp for mounting a cable to a surface, the cable mounting clamp comprising:
    a base removably connectable to the surface, the base comprising a tab removably insertable into an aperture defined in the surface and a first lock releasably connectable to the surface, the base further comprising an outer body which defines an inner channel and a support ramp disposed within the inner channel, the inner channel extending along a longitudinal axis;
    a cap connectable to the base to further define the inner channel therebetween;
    a roller tube disposed within the inner channel and rotatably mounted on the support ramp, wherein the cable is configured to be inserted through the roller, such that the cable is rotatable with the roller tube about the longitudinal axis; and
    a second lock engageable with the roller tube to prevent rotation of the roller tube.

2. The cable mounting clamp of claim 1, wherein the roller tube comprises a first outer flange and a second outer flange, and wherein the support ramp comprises a first rail and a second rail.

3. The cable mounting clamp of claim 1, wherein the roller tube comprises a central portion, a first end portion, and a second end portion, and wherein the first and second end portions each comprise one or more outer ribs.

4. The cable mounting clamp of claim 1, further comprising a heat shrink tube connected to the roller tube.

5. The cable mounting clamp of claim 1, wherein the second lock is a set screw.

6. The cable mounting clamp of claim 1, wherein the tab is a plurality of tabs.

7. The cable mounting clamp of claim 1, wherein the first lock comprises a lever, the lever comprising a handle, a pivot point, and a contact face opposite the handle relative to the pivot point.

8. The cable mounting clamp of claim 1, wherein the first lock comprises an arm cantilevered from the base, and wherein a handle extends from a distal end of the arm.

9. The cable mounting clamp of claim 1, wherein the tab is a plurality of tabs.

10. A cable assembly mountable to a surface, the cable assembly comprising:
- a cable; and
- a cable mounting clamp, the cable mounting clamp comprising:
  - a base removably connectable to the surface, the base comprising a tab removably insertable into an aperture defined in the surface and a first lock releasably connectable to the surface, the base further comprising an outer body which defines an inner channel and a support ramp disposed within the inner channel, the inner channel extending along a longitudinal axis;
  - a cap connectable to the base to further define the inner channel therebetween;
  - a roller tube disposed within the inner channel and rotatably mounted on the support ramp, the roller tube rotatable about the longitudinal axis; and
  - a second lock engageable with the roller tube to prevent rotation of the roller tube,
  - wherein the cable is inserted through the roller tube and extends through the inner channel, such that the cable is rotatable with the roller tube about the longitudinal axis.

11. The cable assembly of claim 10, wherein the roller tube comprises a first outer flange and a second outer flange, and wherein the support ramp comprises a first rail and a second rail.

12. The cable assembly of claim 10, wherein the roller tube comprises a central portion, a first end portion, and a second end portion, and wherein the first and second end portions each comprise one or more outer ribs.

13. The cable assembly of claim 10, further comprising a heat shrink tube connected to the roller tube and the cable.

14. The cable assembly of claim 10, wherein the first lock comprises a lever, the lever comprising a handle, a pivot point, and a contact face opposite the handle relative to the pivot point.

15. The cable assembly of claim 10, further comprising a locating protrusion extending from the base.

16. A cable mounting clamp for mounting a cable to a surface, the cable mounting clamp comprising:
- a base removably connectable to the surface, the base comprising a tab removably insertable into an aperture defined in the surface and a lock releasably connectable to the surface, the base further comprising an outer body which defines an inner channel and a support ramp disposed within the inner channel, the inner channel extending along a longitudinal axis;
- a cap connectable to the base to further define the inner channel therebetween; and
- a roller tube disposed within the inner channel and rotatably mounted on the support ramp, wherein the cable configured to be inserted through the roller, such that the cable is rotatable with the roller tube about the longitudinal axis;
- wherein the lock comprises a lever, the lever comprising a handle, a pivot point, and a contact face opposite the handle relative to the pivot point.

17. The cable mounting clamp of claim 16, wherein the roller tube comprises a first outer flange and a second outer flange, and wherein the support ramp comprises a first rail and a second rail.

18. The cable mounting clamp of claim 16, wherein the roller tube comprises a central portion, a first end portion, and a second end portion, and wherein the first and second end portions each comprise one or more outer ribs.

19. The cable mounting clamp of claim 16, further comprising a heat shrink tube connected to the roller tube.

20. The cable mounting clamp of claim 16, wherein the second lock is a set screw.

* * * * *